United States Patent [19]
Mitchell et al.

[11] Patent Number: 5,966,671
[45] Date of Patent: *Oct. 12, 1999

[54] RADIOTELEPHONE HAVING AN AUXILIARY ACTUATOR AND METHOD FOR OPERATING SAID RADIOTELEPHONE

[75] Inventors: Kevin Patrick Mitchell, Palatine; Pamela Ann Dillard, Lake Zurich; Carolyn Sue Schmitz, Mt. Prospect; Earle Timothy Roberts, Grayslake, all of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/581,010

[22] Filed: Jan. 3, 1996

[51] Int. Cl.⁶ ...................................................... H04Q 7/32
[52] U.S. Cl. ............................................ 455/575; 455/566
[58] Field of Search .............................. 455/575, 90, 403, 455/566; D14/137, 138; 379/422, 428, 433, 434

[56] References Cited

U.S. PATENT DOCUMENTS

| D. 369,599 | 5/1996 | Wang | D14/138 |
|---|---|---|---|
| 4,654,488 | 3/1987 | Westfall | 200/5 R |
| 4,677,429 | 6/1987 | Glotzbach | 340/711 |
| 5,025,466 | 6/1991 | Hilligoss et al. | 379/21 |
| 5,384,825 | 1/1995 | Dillard | 455/460 |
| 5,436,954 | 7/1995 | Nishiyama | 455/90 |
| 5,491,507 | 2/1996 | Umezawa et al. | 379/433 |
| 5,561,436 | 10/1996 | Phillips | 455/575 |
| 5,561,705 | 10/1996 | Allard et al. | 455/460 |

FOREIGN PATENT DOCUMENTS

| 0 455 808 A1 | 9/1991 | European Pat. Off. . |
|---|---|---|
| 463856A2 | 1/1992 | European Pat. Off. . |
| 0 473 402 A2 | 3/1992 | European Pat. Off. . |
| 0 588 210 A1 | 3/1994 | European Pat. Off. . |
| 0 679 003 A2 | 4/1995 | European Pat. Off. . |
| 0 678 987 A1 | 10/1995 | European Pat. Off. . |
| 0 726 657 A1 | 8/1996 | European Pat. Off. . |
| 0 726 668 A1 | 8/1996 | European Pat. Off. . |

OTHER PUBLICATIONS

TH241 Sony Users Manual, Apr. 1994.

*Primary Examiner*—Dwayne D. Bost
*Assistant Examiner*—Myron K. Wyche
*Attorney, Agent, or Firm*—John King

[57] ABSTRACT

A unique actuator (130) and user interface preferably located on one side of a communication device enables one-handed operation of the device, such as a radiotelephone or other portable communication device. In particular, a multifunction rocker switch (302) may rotate around or slide along a particular axis to scroll up and down through functions, while the rocker switch could move in an orthogonal direction to select a function. Alternatively, three keys (124–128) could be employed in place of the multifunction rocker switch. Among other functions, the actuator will preferably provide the user access to menu features (604) to perform the confirmation or selection operation in most menu features and access to the name directory (610) to place calls when reviewing a number and to terminate a call when completed.

7 Claims, 5 Drawing Sheets

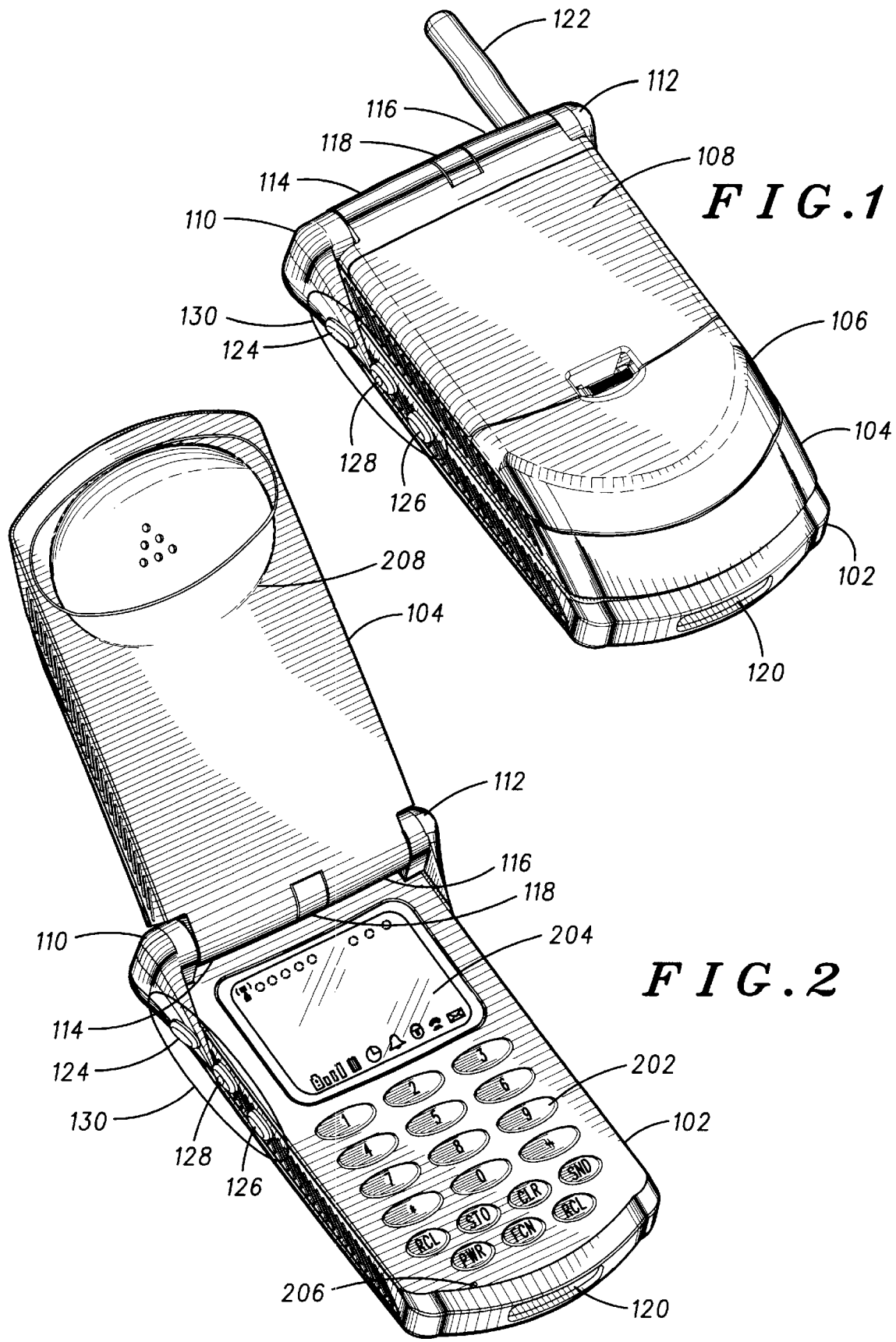

RADIOTELEPHONE HAVING AN AUXILIARY ACTUATOR AND METHOD FOR OPERATING SAID RADIOTELEPHONE

FIELD OF THE INVENTION

The present invention is generally related to a communication device, and more particularly to a method and apparatus for actuating a function of a communication device.

BACKGROUND OF THE INVENTION

As wireless communication devices have been significantly reduced in size, they have become easier to transport and use in a variety of environments. Conventional communication devices such as radiotelephones include the standard telephone keys (0–9, *, #) as well as other functional keys to implement various functions of the radiotelephone. However, the operation of conventional radiotelephones is inhibited by the keypad layout. In particular, current radiotelephones often require two hands to implement functions of the radiotelephone. A user of a radiotelephone will typically hold the device in one hand while actuating keys commonly located on the surface of the radiotelephone.

Some conventional radiotelephones have included a pair of discrete keys for controlling the volume of the radiotelephones. Other conventional radiotelephones have added thumb wheels or thumb balls to improve the operation of the device. However, such modifications merely reduce the time required to cursor through a menu, but do not improve the ability to implement functions of the radiotelephone.

Further, as the size of wireless communication devices decreases, the surface area available for keys is significantly reduced. Conventional radiotelephones have a keypad located on the front surface. Although some conventional radiotelephones have added keys on a surface other than the front surface having the main keypad, such keys have limited functionality and must be used in conjunction with the main keypad.

Accordingly, there is a need for a novel method and apparatus for actuating functions of a communication device.

Additionally, there is a need for novel method and apparatus for enabling one-handed operation of a communication device.

BRIEF DESCRIPTION OF THE DRAWINGS

FIG. 1 is a perspective view of a wireless communication device in a closed position incorporating the invention;

FIG. 2 is a perspective view of the wireless communication device of FIG. 1 in an open position;

DESCRIPTION OF THE PREFERRED EMBODIMENTS

Figure 3:
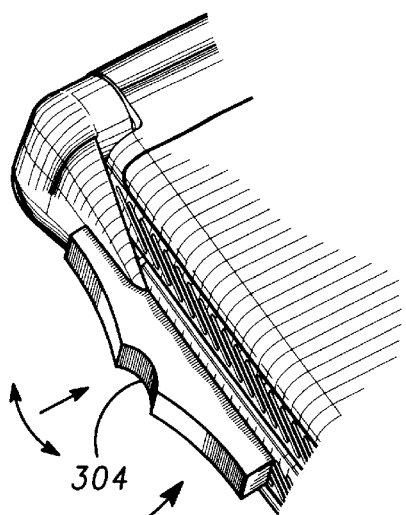
FIG. 3 is a partial perspective view of an alternate embodiment of an actuator of the present invention.

A unique actuator and user interface enables one-handed operation of a wireless communication device, such as a radiotelephone or other portable communication device. In particular, an actuator located on the side of the radiotelephone separate from the main keypad enables one-handed operation of frequently used features operations. For example, a multifunction rocker switch may rotate around or slide along a particular axis to scroll up and down through functions, while the rocker switch could be pressed inward to select a function. Alternatively, three discrete keys could be employed in place of the multifunction rocker switch. In particular, an actuator button (hereinafter referred to as "the smart button") could supplement two keys used for scrolling.

The communication device distinguishes between long and short press of the smart button, and enters a state depending on the duration of the press. In addition, the function of the smart button is dependent upon the current state of the communication device. Long presses of the smart button are preferably required to perform certain functions in order to avoid inadvertent presses. Among other functions, the smart button preferably provides the user access to the name directory and menu subsystems. The smart button preferably provides the user with the ability to place calls when reviewing a number, and to terminate a call when completed. In addition, the smart button will perform a confirmation or selection operation in most feature operations. A picture representation such as a diamond may optionally be reproduced on a display to aid the user in implementing a function. Additional features of the method and apparatus of the present invention will be described in more detail in reference to the figures depicting the invention.

Referring to FIG. 1, a perspective view of a wireless communication device 100 such as a cellular telephone having movable elements or other type of radiotelephone incorporating the invention is shown in a closed position. Although the method and apparatus could be incorporated in any radiotelephone, the present invention finds particular application in a foldable phone to enable operation when the phone is in a closed position and the keypad is covered. A lower housing 102 is coupled to an upper housing 104 having an outer housing cover 106 and a detachable battery 108. Lower housing 102 includes hinge elements 110 and 112 which intercouple with hinge elements 114 and 116 of upper housing 104. A cylinder 118 for routing conductors between lower housing 102 and upper housing 104 is positioned within upper housing 104 between hinge elements 114 and 116. Cylinder 118 preferably enables conductors on a flex strip to make a connection between electrical components located in the upper housing and the lower housing. Lower housing 102 preferably includes an external connector 120 for transmitting or receiving signals from an external device, and an antenna 122 for transmitting or receiving radio frequency (RF) signals. The communication device as shown can easily be placed in a holster or other carrying device.

As shown in FIG. 2, the communication device can be opened, exposing a main keypad 202 on a first, a display 204, a microphone aperture 206, and a speaker 208. The display preferably includes indicator icons for the Menu subsystem. The display also preferably includes dedicated signal strength and battery meters and may include additional indicators such as light emitting diodes (LED's) used for "In Use", "Roam", and "No Service". Also shown in FIG. 2 is a cursor up key 124, a cursor down key 126 and the smart button 128 of actuator device 130 on a second surface of the device.

An alternate embodiment of actuator device 130 is shown in FIG. 3. In particular, an actuator 302 comprises a single piece having a thumb detent 304. The actuator could be rotated as shown by the curved arrows to enable a cursoring function or pressed toward the phone to make a selection. A clockwise rotation would enable cursoring through a name directory or a main menu toward the top of the directory or menu, while a counterclockwise rotation will enable cursoring to the bottom of the name directory or the menu. Alternatively, the cursoring function could be implemented by sliding the actuator up and down along the side of the device (orthogonal to the direction for selecting). The selection function of the actuator will be described in more detail in reference to the remaining figures. Although the additional discrete keys or rocker switch are preferably added to the side surface of the radiotelephone to enable operation of certain functions in a holster, for example, the actuator could be placed at any position on the device. Also, other types of actuators such as dials which rotate around a first axis to cursor through a menu and slide along a second axis could be employed. Also, while the present invention finds particular application in a foldable communication device where the main keypad would be covered when the device is closed, the present invention could be used in any communication device, including communication devices having a reduced keypad or communication devices having no conventional telephone keypad but preprogrammed information.

Figure 4:
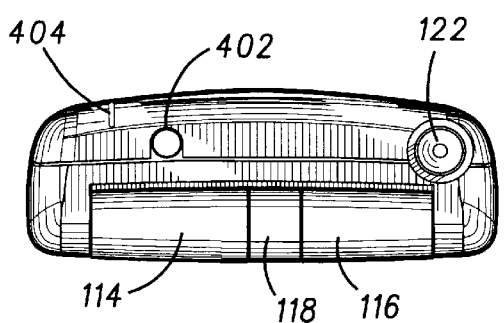
FIG. 4 is a top plan view of the wireless communication device of FIG. 1.

Turning now to FIG. 4, a top plan view of the wireless communication device of FIG. 1 is shown. An earpiece receptacle 402 is adapted to receive a headphone jack for operation of the radiotelephone in the closed position. Also shown is a status indicator 404 for providing visual feedback to a user when a user is wearing the phone, in a holster for example. Status indicator 404 is preferably a bi-colored LED mounted on the top of the device to enable the user to check the status of device without removing it from a holster or opening it if it is a foldable device. Status indicator 404 will be illuminated whenever the radio is on and the phone is closed, while the display will not be illuminated in this state. Status Indicator 404 will be active while the phone is locked to give the user an indication the phone is powered and in service at all times when the phone is closed. Preferably, status Indicator 404 could indicate when the phone initiates or is in a call with additional colors. The following table 1 provides an exemplary description of a dual color scheme which could be employed according to the present invention:

TABLE 1

|  | Red | Red/Green | Green | Yellow |
|---|---|---|---|---|
| Slow Flash 25% DC 0.5 Hz | No Service |  | In Service Home System | Roam on Home Type System |
| Fast Flash 50% DC 1.0 Hz |  |  |  | Roam on Non-Home Type System |
| Alternate 500 ms each color |  | Incoming Call Alert |  |  |

Other actuating devices, such as a power button, could be placed on the top surface of the phone to enable turning the device on or off when it is in a holster or closed.

Figure 5:
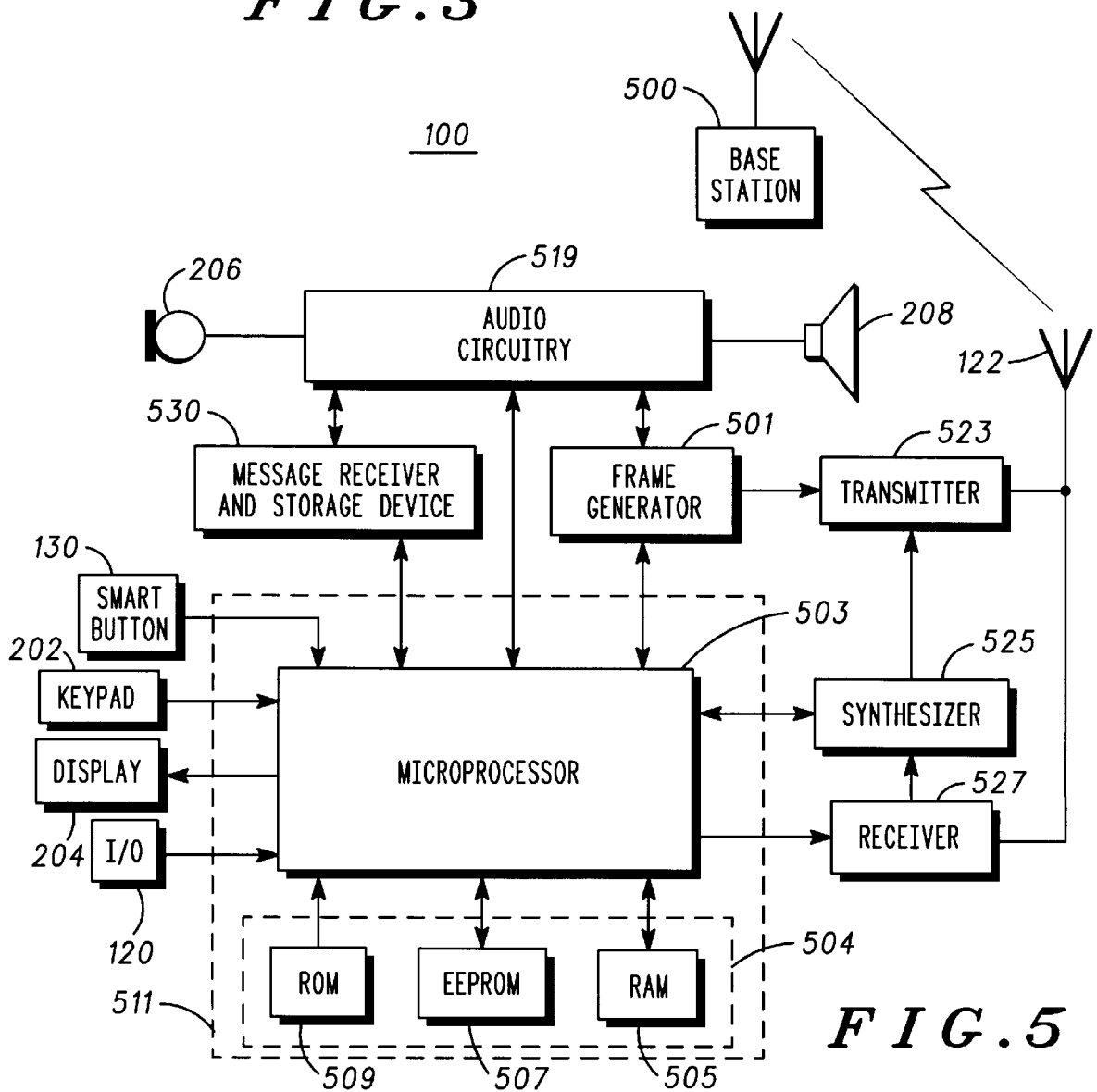
FIG. 5 is block diagram of a communication device incorporating the present invention.

Turning now to FIG. 5, a block diagram of a wireless communication device such as a cellular radiotelephone incorporating the present invention is shown communicating with a base station of a wireless communication system such as a cellular system. In the preferred embodiment, a frame generator ASIC 501, such as a CMOS ASIC available from Motorola, Inc. and a microprocessor 503, such as a 68HC11 microprocessor also available from Motorola, Inc., combine to generate the necessary communication protocol for operating in a cellular system. Microprocessor 503 uses memory 504 comprising RAM 505, EEPROM 507, and ROM 509, preferably consolidated in one package 511, to execute the steps necessary to generate the protocol and to perform other functions of the wireless communication device, such as accepting input/output information by way of a connector 120, accepting information from actuator 130 or a main keypad 202 according to the present invention, writing to a display 204, controlling a frequency synthesizer 525, or performing steps necessary to actuate a function according to the method of the present invention. ASIC 501 processes audio transformed by audio circuitry 519 from a microphone 206 and to a speaker 208.

A transceiver processes the radio frequency signals. In particular, a transmitter 123 transmits through an antenna 122 using carrier frequencies produced by a frequency synthesizer 525. Information received by the communication device's antenna 122 enters receiver 527 which demodulates the symbols using the carrier frequencies from frequency synthesizer 525. The communication device may optionally include a message receiver and storage device 530 including digital signal processing means. The message receiver and storage device could be, for example, a digital answering machine or a paging receiver. Although a single microprocessor is shown, two microprocessors could be used. For example, a keyboard microprocessor could detect depressions of the keypad and actuator and communicate with a main microprocessor which performs other functions of the device.

Figure 6:
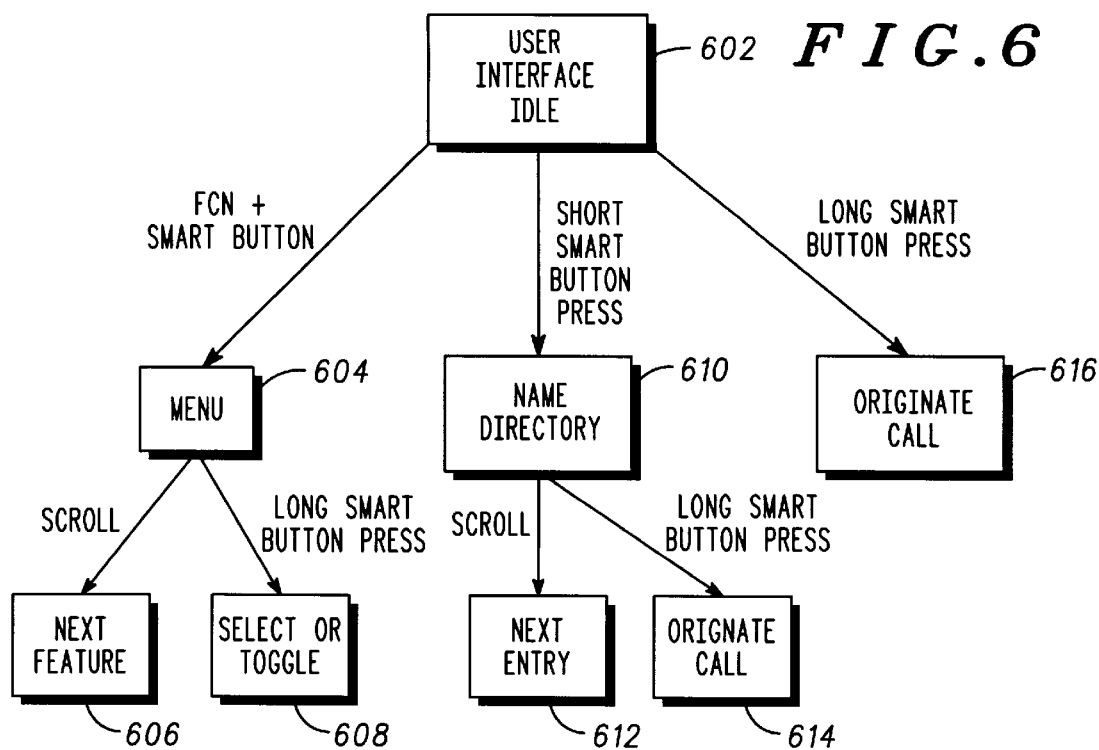
FIG. 6 is a general state diagram showing the operation of the user interface of the present invention.

Turning now to FIG. 6, a flow chart shows the general operation of the user interface according to the present invention. The communication device distinguishes between long and short press of the smart button, and enters a state depending on the duration of the press. In addition, the function of the smart button is dependent upon the current state of the communication device. Long presses of the smart button are preferably required to perform certain functions in order to avoid inadvertent presses. A long keypress could be, for example, 750 msecs. Among other novel features of the invention, the smart button enables access to and call placement from the name directory, control of a call, such as answering, originating, redialing, and ending, and access to the menu and feature selection by using a single button, the smart button.

In particular, as shown in FIG. 6, the user interface is idle at a step 602. If FCN is selected followed by the smart button, the menu will be entered at a step 604. The user can then scroll through the menu using the up and down scroll keys at a step 606. At any point in the menu, the user can select or toggle, depending upon the feature, at a step 608. Alternatively, a short press to the smart button will enable access to the name directory at a step 610. The user can then scroll through the directory using the up and down scrolling keys at a step 612. At any point when scrolling in a name directory, a long press of the smart button will originate a phone call at a step 614. Finally, a long press of the smart button when in the idle user interface will originate a call at a step 616 to a number in a scratchpad.

Figure 7:
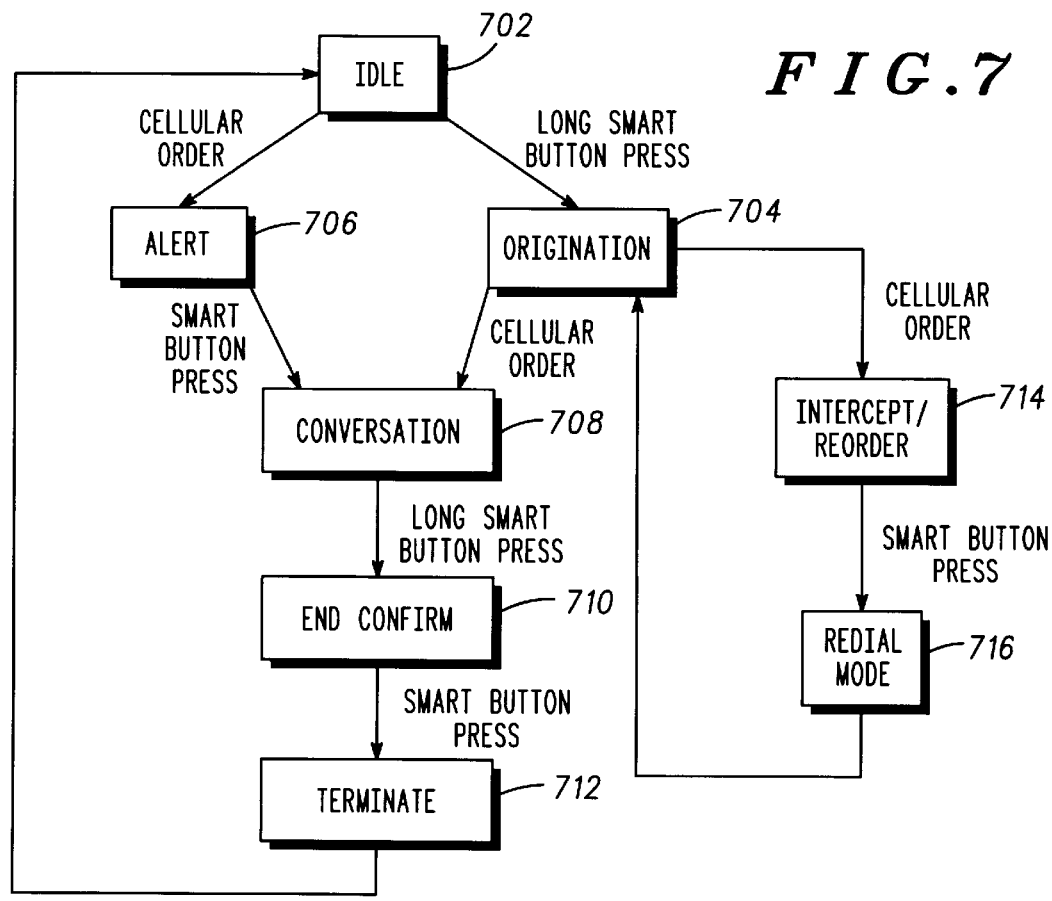
FIG. 7 is a general state diagram showing the call processing states of the present invention.

Turning now to FIG. 7, a flow chart shows the general operation of the communication device for receiving, originating, or terminating calls using the smart button. When the communication device is in the idle state at a step 702, a long smart button key press will originate a call at a step 704. Alternatively, a cellular order could be received which would generate an alert at step 706. A press of the smart button would then answer the call to enter a conversation at step 708. A long press of the smart button could then be used to terminate the call. Optionally, the user could be required to press the smart button for a second time at a step 710 to terminate the call at a step 712. If a intercept or reorder is received at a step 714, a press of the smart button would enter redial mode at a step 716.

Figure 8:
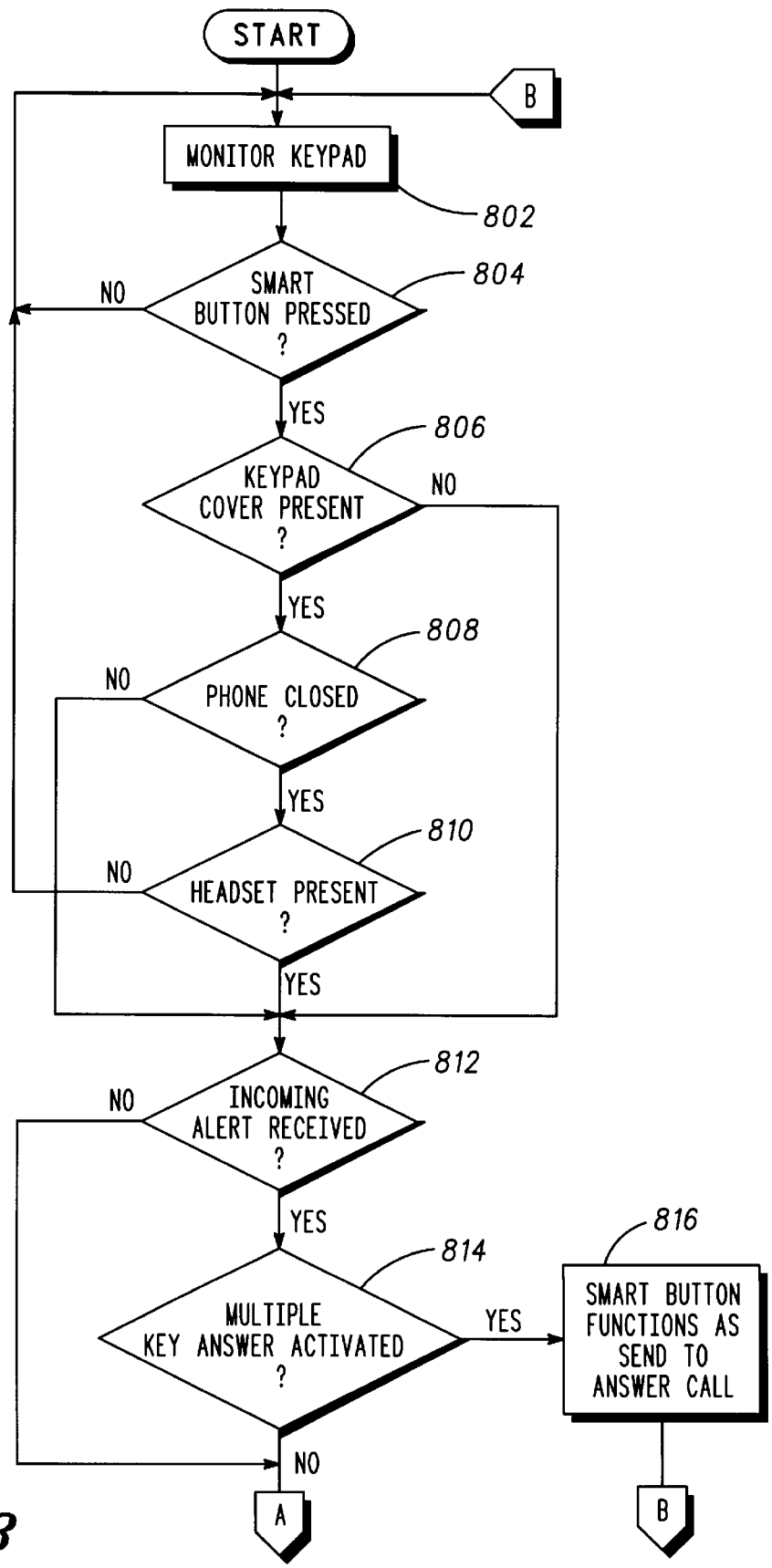
FIGS. 8 and 9 are flow diagram showing the operation of the present invention.

Turning now to FIG. 8, the operation of the circuit of FIG. 5 implementing the present invention is shown. Microprocessor 503 monitors keypad 202 and actuator device 130 at a step 802. If the smart button 128 is pressed at a step 804, the microprocessor determines whether a keypad cover is present at a step 806. If a keypad cover is present, the microprocessor determines whether the phone is closed at a step 808. If the phone is closed, the microprocessor then determines if a headset is present at a step 810. If the phone is closed, but no headset is present, the microprocessor continues to monitor the keypad at a step 802.

According to a novel feature of the invention, the smart button can be used to answer incoming calls. In order to prevent inadvertent answering of calls, a multiple-key answer feature (i.e. any key answer) which will allow a single key selection other than SND to answer a call must be enabled by the user. Multiple key answer operation with the smart button enables the user to answer incoming calls without removing the phone from the holster or opening the phone. If the keypad cover is not present at step 806, the phone is closed at step 808, or the phone is open and the headset is present at step 810, the microprocessor determines whether an incoming alert has been received at a step 812. If an incoming alert has been received, the microprocessor determines whether the multiple key answer function has been enabled at a step 814.

If the multiple key answer has been activated, the smart button functions as a send to answer the call at a step 816 and then continues to monitor the keypad at step 802. However, if multiple key answer is not activated, the microprocessor will continue further processing in FIG. 9. In a communication device having a vibrator active, one press of the smart button will stop the vibrator but will not answer the call. Two presses of the smart button are preferably necessary when answering. This provides the user the ability to stop the vibration without answering the call. Another press of the smart button will END the call.

Figure 9:
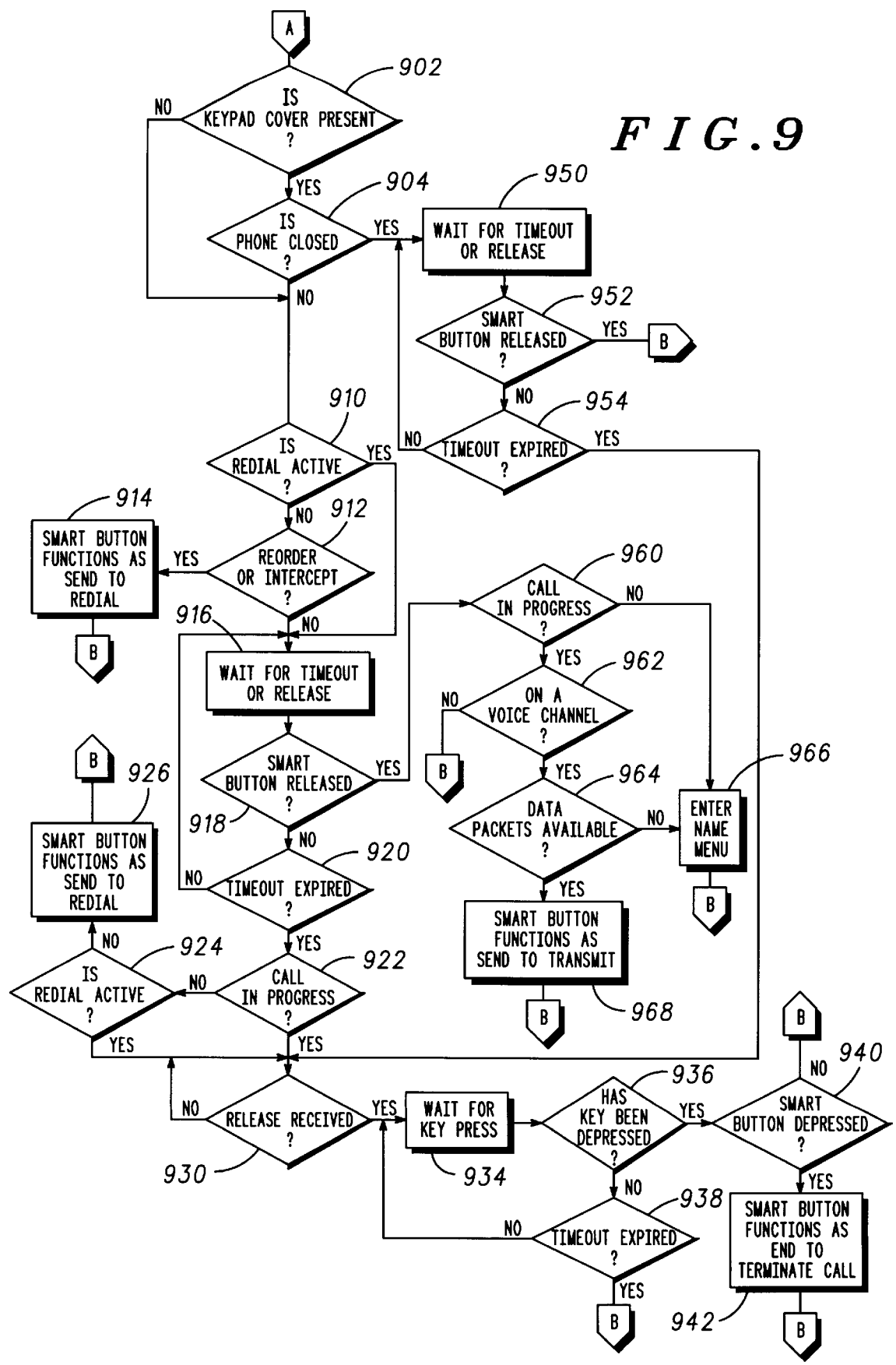

As shown in FIG. 9, the microprocessor will determine if the keypad cover is present at a step 902. If a cover is present, the microprocessor determines whether the phone is closed at a step 904. If no keypad cover is present or the phone is closed, the microprocessor determines whether redial is active at a step 910. If redial is not active, the microprocessor determines whether reorder or intercept is active at a step 912. If a reorder or intercept is active, the smart button functions as a send to redial at a step 914 and continues the monitor the keypad.

In addition to answering a call, it would be desirable to enable ending a call without use of the phone keypad. In general, the user may press and hold the smart button inward to end a call. In order to avoid unintentionally terminating a call, a confirmation will preferably be required. Accordingly, after the smart button is released, the user has 3 seconds to press the smart button again. If any other key is pressed, it is processed accordingly. Referring particularly to FIG. 9, if a redial is active or a reorder or intercept is not received, the microprocessor waits for a time out or release at a step 916. If the smart button is not released at a step 918, the microprocessor determines whether a time-out has expired at a step 920. If the time-out has not expired, the microprocessor continues to wait for time-out or release at step 916. If the time-out has expired, the key tone will be provided and a confirmation prompt will be displayed. The microprocessor then determines whether a call is in progress at a step 922.

If no call is in progress, the microprocessor determines whether redial is active at a step 924. If the redial is not active, the smart button functions as a send to originate the call at a step 926 and continues to monitor the keypad. Preferably, the SND operation will be allowed by pressing and holding the smart button until visual and/or audible call placement feedback is provided to the user when a call has been placed to indicate to the user that the key has been pressed long enough to initiate a call. In particular, the smart button can originate a call when reviewing repertory locations within the name directory or when reviewing the last number dialed stack. Preferably, the numeric portion of the number used to access the network will be displayed in the visual feedback message.

If redial is active, or if a call is in progress, the microprocessor determines whether a second release (i.e. confirmation release) is received at a step 930. If a release is received, the microprocessor waits for a keypress at a step 934. In particular, the microprocessor determines whether any key has been depressed at a step 936. If the smart button is pressed, the call is ended. If no key has been depressed, the microprocessor determines whether a time-out has expired at a step 938. If the time-out has not expired, the microprocessor continues to wait for a keypress at step 934. If the time-out has expired, the microprocessor continues to monitor the keypad at step 802. If a key has been depressed at step 936 before the time-out expires, the microprocessor determines whether the smart button is depressed at step 940. If the smart button is depressed, the smart button functions as an end to terminate the call. The microprocessor will then continue to monitor the keypad for other key depressions and process those key depressions.

If the microprocessor determines that the phone is closed at a step 904, the smart button can still be used to terminate a call by requiring that the smart button be selected for a predetermined period of time followed by a confirmation selection. In particular, the microprocessor will wait for a time-out or release at a step 950. If the smart button is released at a step 952, the microprocessor continues to monitor the keypad at step 602. Otherwise, the microprocessor will determine whether a time-out has expired at a step 954. If the time-out has expired, the microprocessor will then determine whether the smart button has released at a step 930 to wait for the appropriate confirmation.

If smart button is released at step 918 before a time-out expires, the smart button will not function to end the call, but may function to enter the name menu or transmit data. In particular, a short inward press of the smart button will provide access to the Name Directory. This will provide the user the ability to view the numbers stored within repertory. The microprocessor first determines whether a call is in progress at step 960. If a call is in progress, the microprocessor will determine whether the phone is on a voice channel at a step 962. If the phone is not on a voice channel, if will continue to monitor the keypad. Otherwise, the microprocessor will determine whether data packets are available at a step 964. If data packets are available, the smart button will function as a send to transmit at a step 968. The transmission of data packets is accomplished according to U.S. Pat. No. 5,384,825, entitled METHOD FOR MEMORY DIALING FOR CELLULAR PHONES, and filed by Pamela A. Dillard, Alisa C. Chan and Robert K. Krolopp on Jul. 1, 1993 in the name of Motorola, Inc., assignee of the present invention, the entire application of which is incorporated herein by reference. If no data packets are available or the call is not in progress, the microprocessor will enter the name menu function at a step 966.

The FCN key followed by the smart button will also access the main menu. The FCN key followed by the smart button followed by digit keys will access the direct menu items. The cursor keys 124 and 126 will provide scrolling functionality throughout the Menu subsystem. The smart button will confirm selection of a menu item or toggle a menu item's status (on/off). The following table provides a list of user functions which are selected or toggled by the smart button, depending on the function:

TABLE 2

| Menu Item | Operation |
| --- | --- |
| Phone Book | Smart Button To Select |
| Timers | Smart Button To Select |
| Tone Control | Smart Button To Select |
| Lock Secure | Smart Button To Select |
| Phone Options | Smart Button To Select |
| Message | Smart Button To Select |
| Recall by Name | Smart Button To Select |
| Recall by Location | Smart Button To Select |
| Store Number | Smart Button To Select |
| Edit | Smart Button To Select |
| (Edit) By Location | Smart Button To Select |
| (Edit) By Name | Smart Button To Select |
| (Edit) Name or Number Displayed | Smart Button To Select |
| (Edit) Name/Number manipulation | Smart Button to accept info |
| My Number | Smart Button To Select |
| Number Pref On/Off | Smart Button To Toggle |
| Name Pref On/Off | Smart Button To Toggle |
| Reset Timer | Smart Button To Select |
| Indiv Timr On/Off | Smart Button To Toggle |
| One Min Timr On/Off | Smart Button To Toggle |
| Repeat Timr On/Off | Smart Button To Toggle |
| Single Timr On/Off | Smart Button To Toggle |
| Beep at 0xx Secs | Smart Button to accept data |
| Ring or Vib Sel | Smart Button To Select |
| Vibrate Only | Smart Button To Select |
| Ring Only | Smart Button To Select |
| Vib On RingOn | Smart Button To Select |
| Vib Off RingOff | Smart Button To Select |
| Ringer On/Off | Smart Button To Toggle |
| Ringer Style X | Smart Button To Select |
| Keypad Tone On/Off | Smart Button To Toggle |
| Scrpad Tone On/Off | Smart Button To Toggle |
| Theft Alrm On/Off | Smart Button To Toggle |
| Theft Alarm Number Entry | Smart Button to accept entry |
| Auto Lock On/Off | Smart Button To Toggle |
| Emergcy Call On/Off | Smart Button To Toggle |
| Secure Options | Smart Button To Select |
| View LocCode | Smart Button To Select |
| Change LocCode | Smart Button To Select |
| Service Level X | Smart Button To Select |
| 1 Mem 1-20 | Smart Button To Select |
| 2 Mem Only | Smart Button To Select |
| 3 Keypd Only | Smart Button To Select |
| 4 Std Setting | Smart Button To Select |
| 5 Local Only | Smart Button To Select |
| 6 No Sto 1-10 | Smart Button To Select |
| 7 Hide Range | Smart Button To Select |
| (7 Hide Range) Range 1-xx | Smart Button to complete range entry |
| 8 Hide Turbo | Smart Button To Select |
| Master Reset | Smart Button To Select |
| Master Clear | Smart Button To Select |
| Change Number | Smart Button To Select |
| Select Mode | Smart Button To Select |
| Feature Review | Smart Button To Select |
| Call Options | Smart Button To Select |
| Delay Call On/Off | Smart Button To Toggle |

TABLE 2-continued

| Menu Item | Operation |
| --- | --- |
| Delayed call, Enter Number number displayed | Smart Button to complete data entry |
| Delayed call, Delay xx Min | Smart Button to accept delay time |
| Cal Rev On/Off | Smart Button To Toggle |
| Auto HF On/Off | Smart Button To Toggle |
| MultKey Ansr On/Off | Smart Button To Toggle |
| Auto Ansr On/Off | Smart Button To Toggle |
| HF Auto Mute On/Off | Smart Button To Toggle |
| HF Simplex/HF Full Display | Smart Button To Toggle |
| Turbo Dial On/Off | Smart Button To Toggle |
| Battery Options | Smart Button Td Select |
| Vox On/Off | Smart Button To Toggle |
| Extend Talk On/Off | Smart Button To Toggle |
| System Options | Smart Button To Select |
| Display SID | Smart Button To Select |
| Signal Mtr On/Off | Smart Button To Toggle |
| Answer Machine | Smart Button To Select |
| Play New | Smart Button To Select |
| Play All | Smart Button To Select |
| Play Announc | Smart Button To Select |
| Record Annouc | Smart Button To Select |
| Ans Mac Options | Smart Button To Select |
| Sel Ans or DTMF | Smart Button To Select |
| Ans On DTMF On | Smart Button To Select |
| Ans Mac Only | Smart Button To Select |
| DTMF Only | Smart Button To Select |
| Ans Off DTMF Off | Smart Button To Select |
| Ans On X Rings | Smart Button To Select |
| Ans Mac Audible/Silent | Smart Button To Toggle |
| Digital Message | Smart Button To Select |
| (DMS) XX New or XX CIDU or XX | Smart Button To Select current message for review |
| (DMS) Clear? | Smart Button To Confirm Clear Entry |
| (DMS) Erase All? | Smart Button To Confirm Clar All |
| To Main Menu | Smart Button To Select |
| Non Menu Task | Operation |
| Scrolling through repertory/ directory | Press and Hold Smart Button to recall number into scratchpad and place call to number |
| Scrolling through repertory/ directory | Press and Hold Smart Button to recall number into scratchpad and place call to number |
| Special Character Insertion Menu Insert Pause or Insert Num 'N | Smart Button to select currently displayed option and add it to scratchpad |
| No task currently active | Press and Hold Smart Button to dial number |
| In reorder or intercept after attempting to origninate a call | Smart Button to enter Redial mode |
| In a call on a voice channel with PIN code active or DTMF packets to transmit | Smart Button to transmit next packet |
| In a call or in Redial mode | Press and Hold Smart Button to End Call or Redial |
| In Alpha Entry mode to store to directory | Smart Button to complete entry and save |
| At Full? Prompt (memory prtoect feature) | Smart Button to confirm overwrite |
| Selectable System (RCL *) | Smart Button to Select current option |
| Selectable System (RCL *), preferred SIDs | Smart Button to complete data entry of SID value |
| Lock? | Smart Button to confirm Locking of radio |
| Current NAM selection (RCL #) | Smart Button to Toggle |
| Additional Functionality | Operation |
| Entry of typed in AKEY | Dual Press of Smart Button to enter value |
| Clear Repertory/Directory Entry | Smart Button to confirm delete |

In addition to providing increased functionality and ease of use, the present invention enables the elimination of keys on the main keypad. Such an improvement becomes particularly significant as the size of communication devices decreases. According to an alternate embodiment of the present invention, the main keypad would be reduced from having seven functional keys to having four functional keys.

In particular, the main keypad would include a FCN key, a combined RCL/STO key, a combined CLR/END key, and a SND key. Because the keypad layout contains both a combined RCL/STO key, the primary operation is RCL while its secondary function (i.e. when preceded by the FCN key) is store. The primary operation of the combined CLR/END key changes based on the state of the radio. While in a call the primary operation is END, but while out of a call its primary operation is CLR. While in a call, the FCN key followed by the combined CLR/END provides a CLR.

Preferably, this operation is consistent in all subsystems with the exception of the menu subsystem. When in the menu, the combined CLR/END key is an END. This provides the user easy exit capability. Because of the necessity to backspace or clear in some features of the menu, the key will act as a CLR (when not in a call) in the following menu items: Store Number, Edit, Repeat/Single Timers, Theft Alarm, Delayed Call, DMS, and Playback of Answering Machine messages. The combined CLR/END key will function as an END key except in the following menu items: Store Number, Edit, Repeat/Single Timers, Theft Alarm, Delayed Call, DMS, and Playback of Answering Machine messages. Also, the CLR key will act as a toggle key in keypad configurations without a STO key. The STO key will act as a toggle key in keypad configurations without a CLR key.

In summary, a unique actuator and user interface preferably located on one side of the telephone enables one-handed operation of a wireless communication device, such as a radiotelephone or other portable communication device. For example, a multifunction rocker switch may rotate around or slide along a particular axis to scroll up and down through functions, while the rocker switch could move in an orthogonal direction to select a function. Alternatively, three discrete keys could be employed in place of the multifunction rocker switch. In particular, an actuator button (hereinafter referred to as "the smart button") could supplement two volume keys used for scrolling. Among other functions, the smart button will preferably provide the user access to the name directory and to place calls when reviewing a number, and to terminate a call when completed, and menu subsystems to perform the confirmation or selection operation in most subsystems. The smart button will preferably provide the user with the ability.

Although the invention has been described and illustrated in the above description and drawings, it is understood that this description is by way of example only and that numerous changes and modifications can be made by those skilled in the art without departing from the true spirit and scope of the invention. Although the drawings show a foldable or hinged phone, the present invention could be employed in any radiotelephone. Although the present invention finds particular application in portable cellular radiotelephones, the invention could be applied to any electronic device, including pagers, electronic organizers, computers or any wireless communication device having moveable housing elements. Applicants' invention should be limited only by the following claims.

We claim:

1. A communication device having a keypad positioned on a first surface of a first housing portion, and a movable element coupled to said first housing portion, said movable element being movable between a first position and a second position and covering said keypad in said second position, said communication device comprising:

an actuator for selecting a function of said communication device located on a second surface of said communication device, said second surface being exposed when said movable element is in said second position and said actuator providing means for scrolling through a user interface and for selecting a feature of the user interface when said movable element is in a first position and enabling answering or termination of a call when said movable element is in said second position.

2. The communication device of claim 1 wherein said actuator comprises a rocker switch adapted to rotate around a first axis to cursor through said user interface and slide along a second axis to select said feature.

3. The communication device of claim 1 wherein said actuator comprises a sliding switch adapted to move along a first axis to cursor through said user interface and slide along a second axis to select said feature.

4. The communication device of claim 1 wherein said actuator comprises a first actuator for scrolling through said user interface and a second switch for selecting said actuator.

5. The communication device of claim 1 wherein said actuator comprises:

a first button for scrolling in a first direction through said user interface;

a second button for scrolling in a second direction through said user interface; and a third button for selecting said feature.

6. A communication device comprising:

a keypad positioned on a first surface of a first housing portion;

a movable element coupled to said first housing portion, said movable element being movable between a closed position and an open position, said movable element covering said keypad in said closed position; and an actuator for selecting a feature of said communication device located on a second surface of said communication device, said second surface being exposed when said movable element is in said second position and said actuator adapted to move in a first direction for scrolling through a user interface and move in a second direction for selecting said feature when said movable element is in a first position and to enable answering or termination of a call when said movable element is in said second position.

7. A radiotelephone comprising:

a keypad positioned on a first surface of a first housing portion;

a movable element coupled to said first housing portion, said movable element being movable between a closed position and an open position, wherein said movable element covers said keypad in said closed position; and an actuator for selecting a feature of said radiotelephone located on a second surface of said radiotelephone, said actuator comprising a first button for scrolling in a first direction through a user interface, a second button for scrolling in a second direction through said user interface; and a third button for selecting a menu item.

\* \* \* \* \*